March 23, 1943.　　　M. KATCHER　　　2,314,404
HYDRAULIC STEERING STABILIZER
Filed May 18, 1940　　2 Sheets-Sheet 1
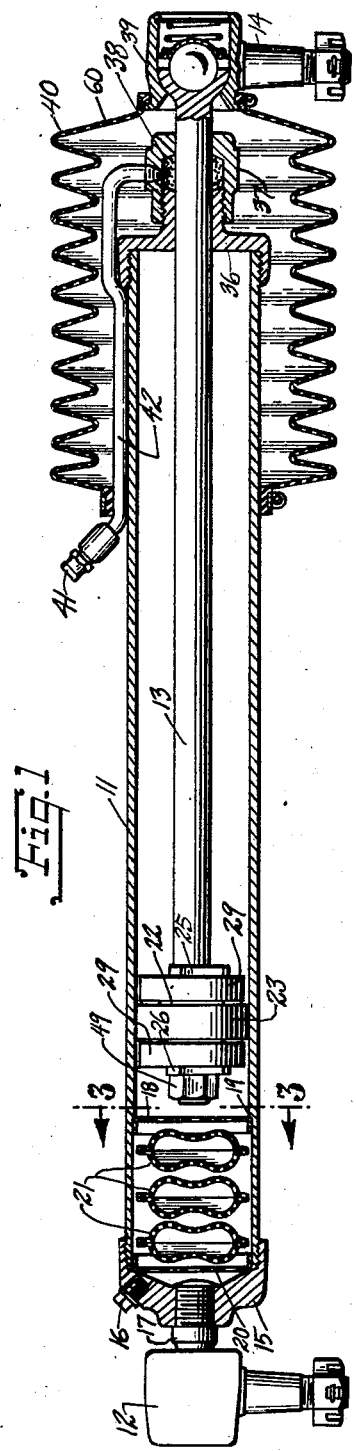
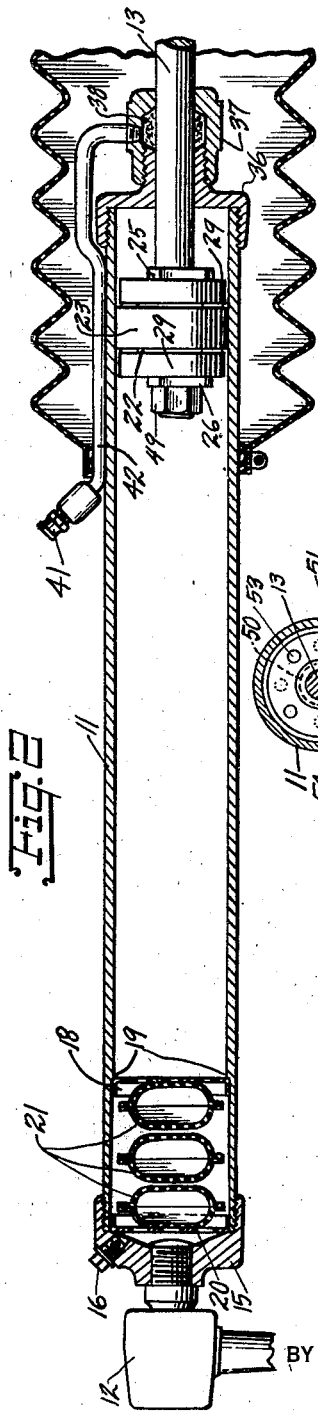
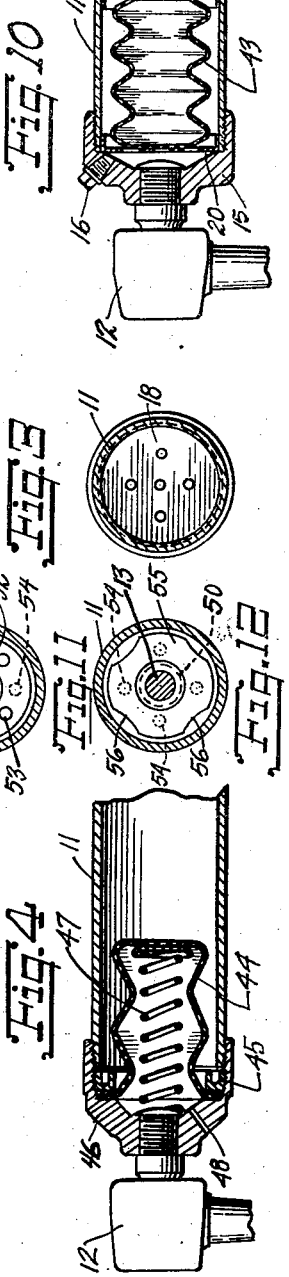
INVENTOR
*Morris Katcher*
BY *Emanuel Scheyer*
ATTORNEY

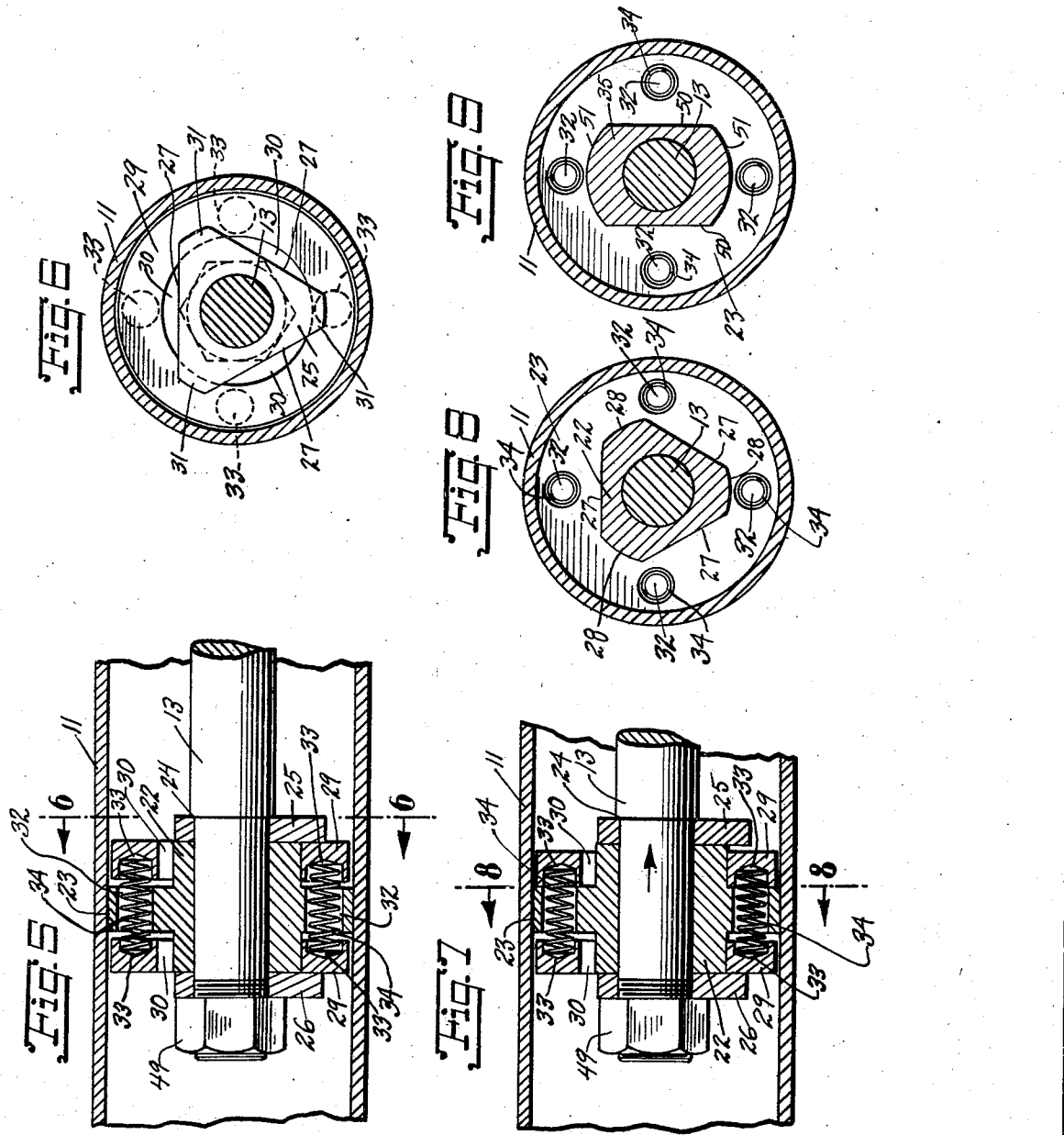

Patented Mar. 23, 1943

2,314,404

UNITED STATES PATENT OFFICE 2,314,404

HYDRAULIC STEERING STABILIZER

Morris Katcher, New York, N. Y.

Application May 18, 1940, Serial No. 335,900

14 Claims. (Cl. 280—90)

This invention relates primarily to a stabilizer for the steering apparatus of motor vehicles (although it is not limited to such specific use), and has for its prime object the provision of means for application to the steering apparatus which will act to maintain the front wheels of the vehicle in their proper position to hold the vehicle in a steady course and prevent so-called "shimmy" or wabble of the front wheels.

A further object is to provide mechanism of the above character which can be easily and quickly applied to existing vehicles without the necessity for any material change or alteration in the vehicles, and which is equally applicable to new vehicles without any material structural alteration therein.

Another object is to provide mechanism of the above character so constructed and arranged that the ordinary operation of the steering apparatus is but little interfered with, but that sudden shocks will be prevented from turning the wheels off their course.

A further object is to provide a device of the above character which will be simple and inexpensive in construction and simple and efficient in operation.

Another object is to provide mechanism of the above character which will, in the event of a tire being suddenly deflated such as by a "blow out" or being "thrown" while the vehicle is in motion, act to hold the vehicle to its course, thus greatly reducing, if not entirely eliminating the possibility of overturning.

This invention differs materially as far as the piston head construction is concerned from that shown in my pending applications Serial Nos. 238,946 and 289,356, now patents numbered 2,252,771 and 2,252,772 respectively, issued on Aug. 19, 1941. The invention differs further in having special provision for confining to one location the air present in the cylinder to compensate for the introduction and withdrawal of the piston rod. In said applications, a certain amount of air is present in the cylinder, but as it is not specially confined, it gets mixed up with the fluid and caught in the piston passages, moves over to the same side of the piston as is the piston rod, and interferes to a certain extent with the operation of the stabilizer.

Other objects and advantages will become apparent upon further study of the specification and drawings, in which:

Fig. 1 is a longitudinal section of the stabilizer shown connected to a knuckle at each end, the piston rod being substantially all the way in the cylinder.

Fig. 2 is a longitudinal section taken similarly to Fig. 1, the piston rod being substantially withdrawn from the cylinder, its outer end, a portion of the boot and knuckle being omitted.

Fig. 3 is a cross section taken along the line 3—3 of Fig. 1.

Fig. 4 is a fragmentary longitudinal section of the stabilizer showing a modified form of displacement compensating device.

Fig. 5 is a longitudinal section through the piston and a part of the cylinder of the stabilizer with the valve sleeves in normal position.

Fig. 6 is a cross section taken along the line 6—6 of Fig. 5.

Fig. 7 is a section taken similarly to Fig. 5 but instead of the valve sleeves being in normal position they are shown in their position due to shock where the piston is forced to the right with reference to the cylinder.

Fig. 8 is a section taken along the line 8—8 of Fig. 7.

Fig. 9 is a section taken similarly to Fig. 8 but shows an alternate shape of piston.

Fig. 10 is a fragmentary longitudinal section of the stabilizer showing another modified form of displacement compensating device.

Fig. 11 is a cross section to a smaller scale taken similarly to Fig. 6 showing a modified form of valve sleeve and piston, and Fig. 12 is a cross section similar to Fig. 11 but showing another modified form of valve sleeve.

The cylinder 11 of the stabilizer is connected through a universal joint or knuckle 12 to a fixed part of the automobile (not shown) such as the front axle. Piston rod 13 is connected through a universal joint or knuckle 14 to a bracket (not shown) on the steering tie rod.

One end of cylinder 11, Figs. 1 and 2, is closed by head 15 which is screwed thereon. Filling screw 16 is provided for the introduction of the stabilizer fluid. Knuckle 12 has its stud 17 screwed into head 15. The bore of cylinder 11 is enlarged somewhat at its left end so that perforated cap 18 can be slid into the cylinder against shoulder 19 formed by the enlarging. Another perforated cap, cap 20, is set in the cylinder to come adjacent head 15. Both caps have a forced fit in the bore of the cylinder so that they remain fixed in the position set. Before forcing in cap 20 and screwing on head 15, capsules 21 containing air are inserted in the cylinder. The material of the capsules may be of rubber, synthetic rubber or other flexible material which is impervious to air and the particular liquid used in the cylinder.

The volume of air in capsules 21 is substantially at its maximum when the piston rod is substantially withdrawn from the cylinder as shown in Fig. 2. When the piston rod is substantially all the way in the cylinder, as in Fig. 1, the volume of air in the capsules is at its minimum. The difference in volume between said maximum and minimum is equal to the volume of piston rod 13 introduced into the cylinder. As will be readily understood, the change in volume of the air in the capsules is to compensate for the different volumes occupied by the piston rod as it is inserted and withdrawn from the cylinder.

The inner end of piston rod 13, Figs. 5–7, is reduced in diameter to provide a shoulder 24 against which is set a washer 25 and against said washer is set piston 22. Against the outer end of piston 22 is set washer 26 and the whole assembly is pushed up tight against shoulder 24 by screwing up nut 49. Piston 22 is provided with an integral collar 23 having a sliding fit with the inside of cylinder 11. The surface of piston 22 is flattened or cut away at a number of places 27, three truly cylindrical portions 28, however, being provided for the mounting thereon of sliding valve sleeves 29. The cylindrical portions are provided merely for convenience in the production and fitting of the parts concentrically with the cylinder, because a sliding fit of another form for valve sleeve 29 could just as well be used. The object of providing flattened or cut away surfaces 27 on piston 22, while valve sleeves 29 have another shaped inside surface, cylindrical in the particular embodiment shown, is to provide passages 30 for the flow of fluid past the sleeves. This is preferred to ports through the sleeves as it can be made to provide freerer flow. Washers 25 and 26 are also provided with flattened or cut away outside surfaces 27, Fig. 6, to correspond to such surfaces on piston 22 so as not to obstruct passages 30.

Another way of providing for the flow of fluid past sleeves 29 is through the space between the outside of said sleeves and the inside of cylinder 11. This space can be made as large as desired so long as passages 32 in collar 23 are not uncovered when the sleeves are brought up against said collar or intermediate portion of piston.

In order to keep sleeves 29 from sliding off piston 22, the washers are provided with portions 31 of larger diameter than the cylindrical portions 28 of the piston. Sleeves 29 are provided with cavities or recesses 33 corresponding to openings 32 in collar 23. Compression springs 34 extend through openings 32 with their ends in cavities 33 normally holding sleeves 29 against washers 25 and 26 and substantially preventing the washers from rotation. There is just enough clearance between the outside of sleeves 29 and the inside of cylinder 11 to avoid friction drag.

A modified form of piston is shown in Fig. 9. Here piston 35 is provided with two cylindrical surfaces 51 and two flat surfaces 50. Sleeves 29 slides over cylindrical surfaces 51. With this form of piston only two passages, such as 30 in Fig. 6, can be provided but they will each be larger than the individual passages shown in said figure.

The end of cylinder 11 through which piston rod 13 passes is provided with a head 36 and a gland 37 screwed on said head, the gland being provided with packing 38. Attached at one end to the outer end of piston rod 13, through the medium of housing 39 of knuckle or universal joint 14, is a boot 40. The other end of boot 40 is attached to the outside of cylinder 11. The attachment of the ends of boot 40 is airtight, said boot being provided to prevent the entrance of dirt into cylinder 11. Boot 40 is formed as a bellows to permit its elongation and contraction in accordance with the movement of piston rod 13 into and out of cylinder 11. The material of the boot may be of leather, rubber or other airtight flexible material. A grease fitting 41 is provided for gland 37, said fitting being outside of boot 40 and connected to said gland through the boot by a tube 42. Breather hole 60 is provided in boot 40 to permit its free expansion and contraction.

During ordinary steering, the relative motion between piston 22 and cylinder 11 is not fast or sudden enough to displace valve sleeves 29 from their normal positions as shown in Fig. 5. If the piston moves, say to the right, under these conditions, liquid will flow from cylinder 11 at the right of piston 22 through passages 30 in right hand sleeves 29, through the space (maintained by springs 34) between said latter sleeve and collar 23, through passages 32 in said collar, through the space (maintained by springs 34) between left hand sleeve 29 and collar 23, and out through passages 30 in left hand sleeve 29 to the left of piston 22. As piston 22 moved to the right, as described above, capsules 21 expanded to compensate for the part of piston rod 13 withdrawn from the cylinder 11. The reverse flow takes place if piston 22 is moved to the left in normal steering and capsules 21 are contracted.

If piston 22 should move suddenly to the right due, say, to one of the front wheels hitting an obstruction, right valve sleeve 29 would assume the position shown in Fig. 7. The liquid not being able to flow fast enough through the openings and passages, as described above, it exerts pressure against right hand sleeve 29 forcing it to the left against the pressure of spring 34. This closes off the space between the right hand sleeve 29 and collar 23 stopping the flow of liquid from the right of piston 22 to its left causing such an increase of pressure momentarily in the liquid to the right of said piston that there is no relative motion between said piston and cylinder 11, preventing, thereby, sudden swerving of the front wheels. If piston 22 should move suddenly to the left, the reverse of conditions just described would take place, left valve sleeve 29 moving to close off the space between itself and collar 23. The motion of the column of liquid between piston 22 and the left head of the cylinder is resisted by the air pressure developed in capsules 21 and the resistance to the flow of the fluid through the perforations in cap 18, the area of said perforations being kept small so as to resist a quick flow such as is induced by shocks, but permitting a slow flow as is induced by steering.

In the modification shown in Fig. 10, the perforated caps 18 and 20 are used just as in Figs. 1 and 2, but instead of using a number of individual capsules a single bellows type of capsule 43 is used.

In the modification shown in Fig. 4, a bellows air container 44, is used, but it is not closed as in the air container capsules of Figs. 1, 2 and 10. The left end of the bellows is pinched between a ring 45, screwed in cylinder head 46 and the inside of said head. Inside of bellows 44 is located a spring 47, normally keeping the bellows expanded. Cylinder head 46 is provided with an air passage 48 leading to the atmosphere from the inside of bellows. The strength of spring 47 is greater than that of springs 34 on the piston 22 so that sudden shocks, pushing piston 22 to the left, will close the space between left sleeve 29 and collar 23 preventing flow of fluid to the right of the piston. Under ordinary steering operations the movement of piston 22 will compress spring 47 as the volume of bellows 44 decreases, the air escaping through passage 48. By keeping air passage 48 small enough it will resist a sudden escape of air acting against sudden shocks as does spring 47 but allowing sufficient escape of air for normal steering.

In the modified form shown in Fig. 11, the end part 50 of the piston is cylindrical and the bore of valve sleeve 51 is a circular hole providing a sliding fit for the sleeve on said part, except for a spline, not shown because it is behind washer 52, which keeps said sleeve from rotating on said part. The function of washer 52 is similar to that described for washer 25, Figs. 5–7. Sleeve 51 is provided with passageways 53 which are out of alignment with passages 54 in intermediate or collar portion 23. Only one sleeve 51, is shown, but it will be understood that there are two of such, one on either side of collar 23 as in Fig. 5. When the sleeves are held in normal position away from intermediate portion 23 by springs 34, the fluid can pass through passageways 53 and passages 54, but when a sudden shock moves one of said sleeves against the intermediate portion, fluid cannot pass through passages 54.

In the modified form shown in Fig. 12, the valve sleeve 55 has a fit on the end part 50 of the piston as described above for Fig. 11, except that it does not have to be splined. The periphery of valve sleeve 55 is provided with cut-outs 56 to permit fluid to flow from one side of the sleeve to the other. There are two such valve sleeves 55 one on either side of intermediate portion 23. Cut-outs 56 act in place of the passageways 53 of Fig. 11, otherwise the action of sleeves 55 is the same as that of sleeves 51.

I claim:

1. A stabilizer for the steering mechanism of a vehicle comprising a liquid containing chamber and a plunger movable therein, said stabilizer adapted for connection between a part of the vehicle stationary with respect to the steering mechanism and the steering mechanism, said plunger having an intermediate portion with its periphery slidably engaging the inside face of the chamber substantially preventing liquid from passing between said periphery and said face, the end parts of the plunger being of less cross-section than said intermediate portion, a valve member for each of said parts, each member having a bore therethrough for slidably mounting it on one of said parts, the shape of the periphery of a part being different from the shape of the bore of the member mounted on it thereby leaving space between the inside of the member and the periphery of said latter part for the passage of liquid from one side of the member to the other, and springs normally holding the members away from said intermediate portion, said intermediate portion having at least one passage extending through it, said members having imperforate portions opposite the ends of said passage, the members when in normal position permitting liquid to flow through said passage, said latter flow being substantially cut off when a sudden relative motion of the plunger and chamber displaces a member from its normal position to move it to the intermediate portion.

2. A stabilizer for the steering mechanism of a vehicle comprising a liquid containing chamber and a plunger movable therein, said stabilizer adapted for connection between a part of the vehicle stationary with respect to the steering mechanism and the steering mechanism, said plunger having an intermediate portion with its periphery slidably engaging the inside face of the chamber substantially preventing liquid from passing between said periphery and said face, the end parts of the plunger being of less cross-section than said intermediate portion, a valve member slidably mounted on each of said parts, and springs normally holding the members away from said intermediate portion, said intermediate portion having at least one passage extending though it, each member having a passage extending through it for permitting a substantial flow from one side of the member to a portion of each of said members forming the side toward the inside face of the cylinder of the passage through it, completely separating said latter passage from said face, the other, the passages in the members being out of alignment with the passage in the intermediate portion, the members when in normal position permitting liquid to flow through the passage in the intermediate portion, said latter flow being substantially cut off when a sudden relative motion of the plunger and chamber displaces a member from its normal position to move it to the intermediate portion.

3. A stabilizer for the steering mechanism of a vehicle comprising a liquid containing chamber, a piston rod movable therein and a plunger mounted on said rod, said plunger having a portion with its periphery slidably engaging the inside face of the chamber substantially preventing liquid from passing between said periphery and said face, the end parts of the plunger being of less cross section than said intermediate portion, valve members adjacent said portion, one on each side thereof and slidable on said end parts to and from said portion, and springs normally holding the members away from said portion, said portion having at least one passage extending through it at a location radially outward from the end parts, said plunger being impassable to the flow of liquid radially inward from said passage, said members' being of sufficiently less outside diameter than the inside diameter of the cylinder to relieve them of friction drag against the cylinder, said members having perforations through them radially outward from said end parts for permitting the flow of liquid from one side of the members to the other, said members having imperforate portions opposite the ends of said passage, the members when in normal position leaving the ends of said passage clear, permitting liquid to flow through it, said latter flow being substantially cut off when a sudden relative motion of the plunger and chamber displaces a member from its normal position to move it to said portion.

4. A stabilizer for the steering mechanism of a vehicle adapted for connection between a part of the vehicle stationary with respect to the steering mechanism and the steering mechanism, said stabilizer comprising a liquid containing chamber and a plunger movable therein, a rod on which the plunger is mounted, said rod extending into the chamber through one end of the latter; said plunger permitting a slow flow of liquid from one side of it to the other, and means holding a quantity of air therein, at least a portion of said means having flexible walls, said means being subject to the pressure of the liquid in the chamber but sealed against the entrance of any of said liquid therein even by leakage, collapsing as the pressure of the liquid is increased and expanding as said pressure is decreased, the movement of the rod into the chamber reducing the free space within the chamber, said reduction of space increasing the pressure of the liquid effecting a corresponding decrease in the volume of air held by said means.

5. A stabilizer for the steering mechanism of a vehicle adapted for connection between a part of the vehicle stationary with respect to the steering mechanism and the steering mechanism, said stabilizer comprising a liquid containing chamber and a plunger movable therein, a rod on which the plunger is mounted, said rod extending into the chamber through one end of the latter, said plunger permitting a slow flow of liquid from one side of it to the other, and flexible means holding a quantity of air sealed airtight therein, said means being immersed in the liquid, the movement of the rod into the chamber reducing the free space within the chamber, said reduction of space increasing the pressure of the liquid upon said means, effecting thereby a corresponding decrease in the volume of air in said means.

6. A stabilizer for the steering mechanism of a vehicle adapted for connection between a part of the vehicle stationary with respect to the steering mechanism and the steering mechanism, said stabilizer comprising a liquid containing chamber and a plunger movable therein, a rod on which the plunger is mounted, said rod extending into the chamber through one end of the latter, and a plurality of flexible walled capsules each holding a quantity of air sealed therein, the capsules being immersed in the liquid, the movement of the rod into the chamber reducing the free space within the chamber, said reduction of space increasing the pressure of the liquid upon the capsules effecting thereby a corresponding decrease in the volume of air in said capsules.

7. A stabilizer for the steering mechanism of a vehicle adapted for connection between a part of the vehicle stationary with respect to the steering mechanism and the steering mechanism, said stabilizer comprising a liquid containing chamber and a plunger movable therein, a rod on which the plunger is mounted, said rod extending into the chamber through one end of the latter, said plunger permitting a slow flow of liquid from one side of it to the other, flexible means holding a quantity of air sealed therein, said means being immersed in the liquid, and a retaining member for confining said means to the other end of the chamber from that through which the rod extends, the movement of the rod into the chamber reducing the free space within the chamber, said reduction of space increasing the pressure of the liquid upon said means, effecting thereby a corresponding decrease in the volume of air in said means.

8. A stabilizer for the steering mechanism of a vehicle adapted for connection between a part of the vehicle stationary with respect to the steering mechanism and the steering mechanism, said stabilizer comprising a liquid containing chamber and a plunger movable therein, a rod on which the plunger is mounted, said rod extending into the chamber through one end of the latter, said plunger permitting a slow flow of liquid from one side of it to the other but substantially stopping a sudden flow, flexible means holding a quantity of air sealed therein, said means being set in the liquid, and a retaining member for confining said means to the other end of the chamber from that through which the rod extends, said member having a restricted open area for the passage of liquid through it, said passage being dampened by the restriction of said area, the movement of the rod into the chamber reducing the free space within the chamber, said reduction of space increasing the pressure of the liquid upon said means, effecting thereby a corresponding decrease in the volume of air in said means.

9. A stabilizer for the steering mechanism of a vehicle adapted for connection between a part of the vehicle stationary with respect to the steering mechanism and the steering mechanism, said stabilizer comprising a liquid containing chamber and a plunger movable therein, a rod on which the plunger is mounted, said rod extending into the chamber through one end of the latter, said plunger permitting a slow flow of liquid from one side of it to the other, and bellows containing air set in the liquid of the chamber and fastened in the other end of the chamber from that through which the rod extends, said bellows being sealed against the entrance of any of said liquid therein even by leakage, said bellows being vented to atmosphere through an opening in the wall of the chamber, the movement of the rod into the chamber reducing the free space within the chamber, said reduction of space increasing the pressure of the liquid upon the bellows, effecting thereby a corresponding collapse of the bellows and the discharge of air therefrom.

10. A stabilizer for the steering mechanism of a vehicle adapted for connection between a part of the vehicle stationary with respect to the steering mechanism and the steering mechanism, said stabilizer comprising a liquid containing chamber and a plunger movable therein, a rod on which the plunger is mounted, said rod extending into the chamber through one end of the latter, said plunger permitting a slow flow of liquid from one side of it to the other but substantially stopping a sudden flow, and bellows containing air set in the liquid of the chamber and fastened in the other end of the chamber from that through which the rod extends, said bellows being vented to atmosphere through a relatively small opening in the wall of the chamber and completely sealed against the entrance of any air and liquid from said chamber, the movement of the rod into the chamber reducing the free space within the chamber, said reduction of space increasing the pressure of the liquid upon the bellows effecting thereby a corresponding collapse of the bellows and the discharge of air therefrom when said movement is slow, but when the movement is sudden the smallness of said opening preventing sudden collapse of the bellows thereby resisting sudden movement of the rod.

11. A stabilizer for the steering mechanism of a vehicle adapted for connection between a part of the vehicle stationary with respect to the steering mechanism and the steering mechanism, said stabilizer comprising a liquid containing chamber and a plunger movable therein, a rod on which the plunger is mounted, said rod extending into the chamber through one end of the latter, said plunger comprising a plurality of relatively movable parts, spring means normally holding the parts in position to permit the flow of liquid from one side of the plunger to the other, said flow being substantially cut off when a sudden relative motion of the plunger and chamber displaces said parts from their normal position against the resistance of the spring means, bellows containing air set in the liquid of the chamber and fastened in the other end of the chamber from that through which the rod extends, said bellows being vented to atmosphere through a wall of the chamber, and a spring yieldingly maintaining the bellows expanded, the resistance of said spring being greater than that of said spring means, the movement of the rod into the chamber reducing the free space within the chamber, said reduction of space increasing the pressure of the liquid upon the bellows effecting thereby a corresponding collapse of the bellows against the resistance of its spring.

12. A fluid containing chamber, a plunger movable therein, a rod on which the plunger is mounted, a bearing at one end of the chamber through which the rod extends into the chamber, an expandible boot attached at one end to the outside of the chamber at a substantial distance away from the bearing and held at the other end to the outer portion of the rod, said boot expanding and contracting respectively as the rod is inserted and withdrawn from the chamber, said ends being sealed against the entrance of dirt, and a tube connected at its inner end to the bearing, the outer end of the tube projecting through the place of attachment of the boot to the chamber, whereby oil inserted into the outer end of the tube is led to the bearing.

13. In a stabilizer for the steering mechanism of a vehicle, a liquid containing cylinder, a piston movable therein, a piston rod on which the piston is mounted, a gland at one end of the cylinder through which the rod extends into the cylinder, an expandible boot attached at one end to the outside of the cylinder and held at the other end to the outer portion of the rod, said boot expanding and contracting respectively as the rod is inserted and withdrawn from the cylinder, said ends being sealed against the entrance of dirt, and a tube connected at its inner end with the inside of the gland, the outer end of the tube projecting through the place of attachment of the boot to the cylinder whereby oil inserted into the outer end of the tube is led to the inside of the gland.

14. A fluid containing chamber, a plunger movable therein, a rod on which the plunger is mounted, a bearing at one end of the chamber through which the rod extends into the chamber, an expandible boot attached at one end to the outside of the chamber and held at the other end to the far portion of the rod, the ends of the boot moving to and from each other respectively, as the rod is moved in and withdrawn from the chamber, said ends being sealed against the entrance of dirt, and a tube connected at its inner end within the boot to the bearing, the tube projecting at its outer end outside of the boot, whereby oil inserted into the outer end of the tube is led to the bearing.

MORRIS KATCHER.